Oct. 7, 1930.   H. E. ALTGELT   1,777,512
TANDEM HARROW
Filed June 27, 1928   2 Sheets-Sheet 1
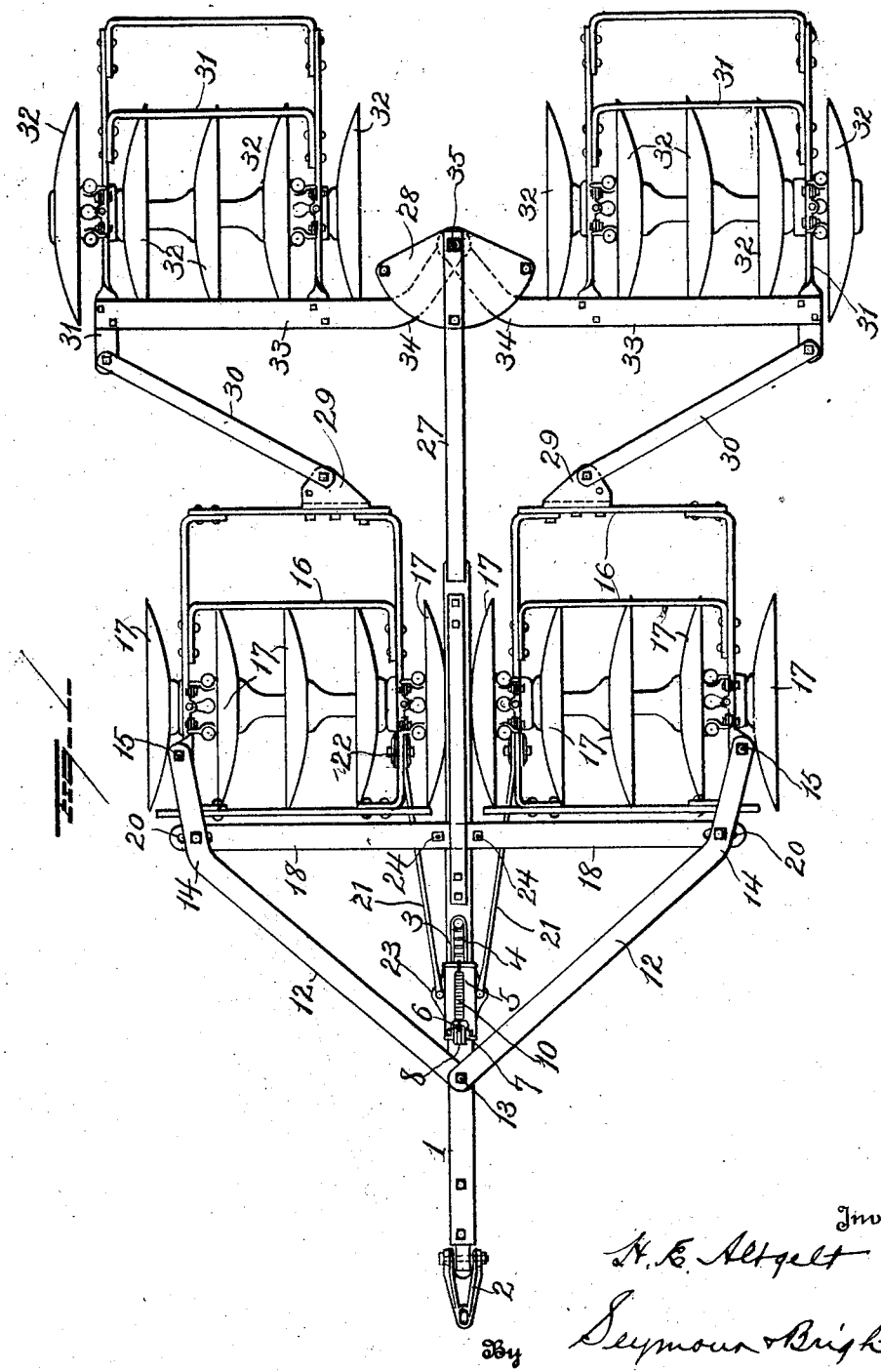
Inventor
H. E. Altgelt
By Seymour & Bright
Attorneys Oct. 7, 1930.    H. E. ALTGELT    1,777,512
TANDEM HARROW
Filed June 27, 1928    2 Sheets-Sheet 2
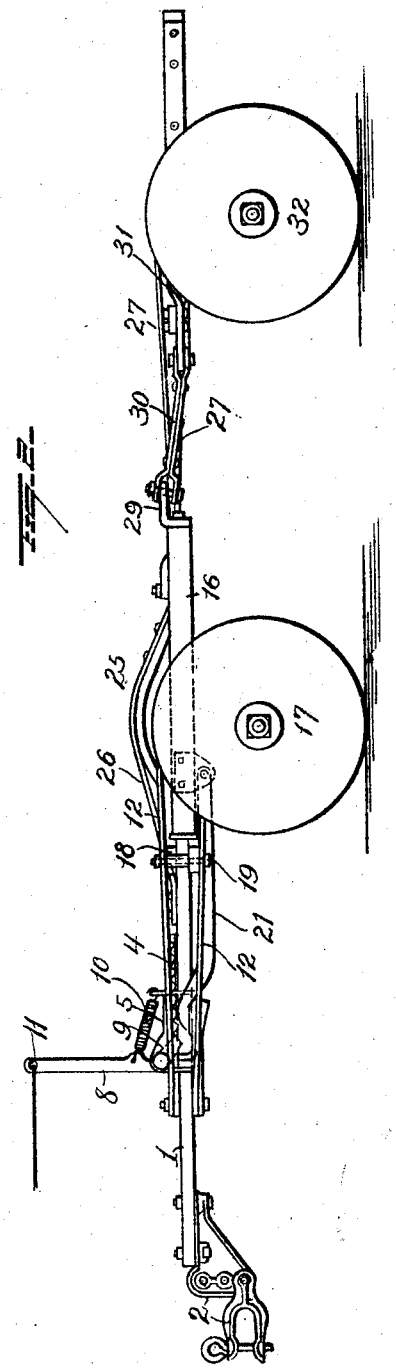
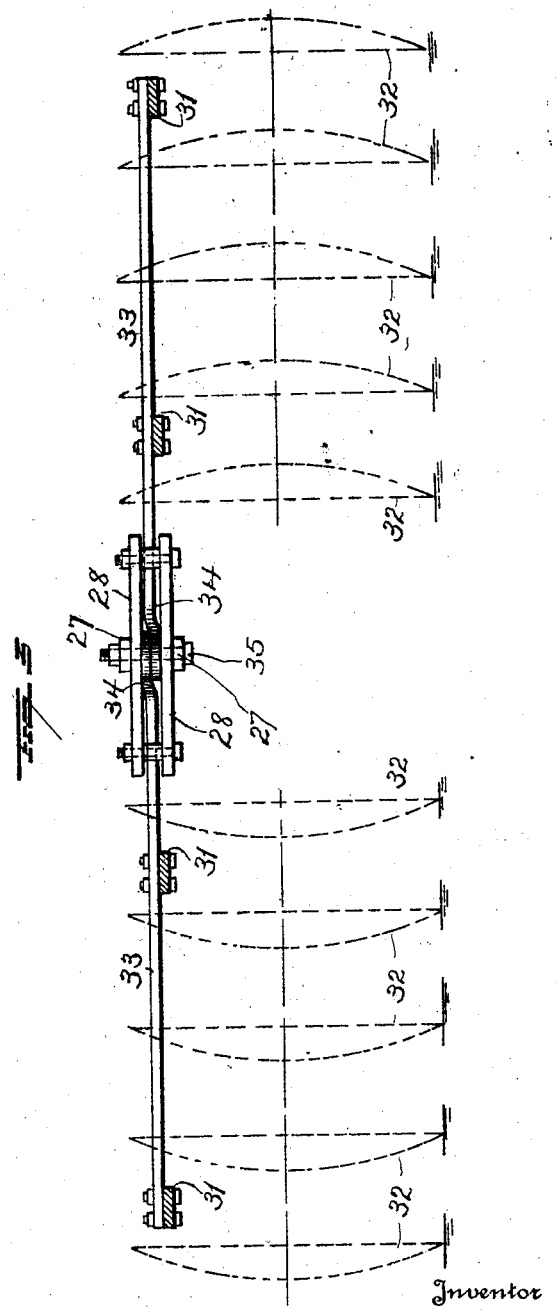
Inventor
H. E. Altgelt
By Seymour & Bright
Attorneys Patented Oct. 7, 1930

1,777,512

UNITED STATES PATENT OFFICE

HERMAN E. ALTGELT, OF SOUTH BEND, INDIANA, ASSIGNOR, BY MESNE ASSIGNMENTS, TO OLIVER FARM EQUIPMENT COMPANY, A CORPORATION OF DELAWARE

TANDEM HARROW

Application filed June 27, 1928. Serial No. 288,703.

This invention relates to that type of harrows in which gangs of harrow disks are arranged in tandem and are so mounted that they may be set in angular relation for working or set at a right angle to the center line for transportation. The object of the invention is to provide for a more even distribution of the draft than has been heretofore attained and to minimize the number of parts, thereby lightening the draft and reducing the cost of production. This object is attained in such a harrow as is illustrated in the accompanying drawing, and the invention resides in certain novel features which will be hereinafter first fully described and then more particularly defined in the appended claims.

In the drawing, Figure 1 is a plan view of a harrow embodying the invention;

Figure 2 is a side elevation of the same;

Figure 3 is a detail rear elevation more particularly showing the connection between the rear gangs.

In carrying out the invention, there is provided a draw bar 1 to the front end of which is secured a clevis 2 to facilitate connection with a tractor or other hauling agency, and it may be noted that the clevis is constructed to permit vertical adjustment of the draft and may be secured to either the top or the bottom of the draw bar, thus providing for a wide range of draft conditions.

On the upper side of the draw bar is formed or rigidly secured a rack bar 3 having longitudinally spaced upstanding lugs or teeth 4, and slidably encircling the draw bar and said toothed element is a sleeve 5 having a notch or slot 6 in its top at its front end and provided with ears 7 at the sides of the notch. Pivoted to and between the ears is a lever 8 having a rearwardly extending pawl 9 at its lower end to engage the lugs or teeth 4, a retractile spring 10 attached to the lever and the sleeve 5 yieldably holding the pawl in engagement with a tooth. At or near the upper end of the lever is a hole 11 for the attachment of a rope whereby the lever may be manipulated from the seat of the tractor.

Outer draft braces 12 are pivoted to the draw bar 1 by a single bolt 13, at a point in advance of the lever, and diverge rearwardly, these draft braces consisting of similar upper and lower flat bars as shown most clearly in Fig. 2. The rear end portions of these draft braces are bent slightly inwardly, as at 14, and their rear extremities are pivoted, at 15, to the outer sides of the frames 16 which carry the front gang of disks 17, and a cross bar 18 extends between the draft braces in front of the frames and is connected with the braces by bolts 19 secured in the braces and passing through slots 20 in the cross bar, this connection accommodating the angular shifting of the braces and preventing excessive spreading of the same. Inner draft braces 21 are rigidly secured at their rear ends, as at 22, to the inner sides of the frames 16 and have their front ends pivotally engaged in lugs 23 on the sides of the sleeve 5.

It will now be understood that when the harrow is being drawn forward, if a pull be exerted on the upper end of the lever the pawl will be swung upward so as to clear the lugs or teeth 4 and the harrow gangs will assume an angular position ready for harrowing, the angular movement ceasing when the pull on the lever is withdrawn and the pawl thereby permitted to drop into engagement with the ratchet bar. When it is desired to again straighten the gangs (in which position the harrow is shown) the tractor is merely backed up and the lever will ride forward over the ratchet bar. In the described angular shifting of the gangs, the primary movement is pivotal about the bolt 13 as a center and both gangs have the same center of movement.

The cross bar 18 slides on the main draw bar 1 and is held against lateral movement by a clip passing beneath the draw bar and secured to the cross bar by bolts 24, the gangs being thus maintained equidistant from the draw bar in all positions. It will be noted that the construction is very simple, the number of parts being minimized without any loss of strength, and as the gangs are always equidistant from the main drawbar the draft is lessened and more evenly distributed than in prior constructions.

The inner ends of the gangs are brought close together so that there will be no central untilled ridge left by the harrow as was the case with many prior constructions, and the rear portion of the drawbar is arched, as at 25, to avoid striking the disks, a brace 26 being provided to reenforce the arched portion of the drawbar.

To the rear end of the drawbar is secured an extension 27 consisting of upper and lower similar bars, and to the rear end of the extension, between the members thereof, are rigidly secured the fan-shaped or substantially triangular plates 28. To the rear ends of the frame 16, adjacent the inner corners thereof, are secured brackets 29 to which are pivoted the front ends of links 30, the rear ends of said links being pivoted to the outer front corners of the frames 31 carrying the rear gangs of disks 32. The front bar 33 of each frame 31 is extended laterally from the inner corner of the frame and carried rearwardly, as at 34, to be pivotally secured by the rear bolt 35 which secures the plates 28 to the drawbar extension 27. The rear gangs thus have a single center of pivotal movement and are always equidistant from the draw-bar, the plates 28 sustaining the extensions 34 and relieving the bending strain upon them and the pivot bolt 35.

Having fully described my invention what I claim as new and desire to secure by Letters Patent, is:—

1. A harrow comprising a drawbar, vertically spaced sustaining plates secured to the rear end of the drawbar, gang frames disposed at the opposite sides of the drawbar and having their front bars extending laterally inward between the sustaining plates, and a single pivot connecting the extremities of the extensions from both gang frames to the draw bar between the sustaining plates.

2. A harrow comprising a drawbar, gang frames disposed at opposite sides of the drawbar, draft braces pivoted to the outer sides of the respective frames and converging forwardly to the drawbar, a single pivot connecting the front ends of both draft braces to the drawbar, shiftable connections between the drawbar and the inner sides of the gang frames, and a crossbar slidably and pivotally connected with the draft braces and slidably engaged with the drawbar.

3. A harrow comprising a drawbar, gang frames disposed at opposite sides of the drawbar, draft braces pivoted to the outer sides of the gang frames and converging forwardly, a single pivot connecting the front ends of the braces to the drawbar at a fixed point, inner draft braces having their rear ends fixed to the inner sides of the respective gang frames, and a shifting device connected to the front ends of the inner draft braces and slidably mounted on the drawbar.

4. A harrow comprising a drawbar, gangs disposed at opposite sides of the drawbar and having lateral extensions at their inner ends, and sustaining plates secured to the top and bottom of the drawbar respectively, the extensions on the gangs projecting between the sustaining plates and having a common pivotal connection with the drawbar.

5. A harrow comprising a drawbar, front and rear gangs of harrowing elements disposed at the sides of the drawbar, the rear gangs having a common pivotal connection with the end of the drawbar, the front gangs being pivoted about their outer ends, and swinging link connections between the outer front corners of the rear gangs and the inner rear corners of the front gangs.

In testimony whereof, I have signed this specification.

HERMAN E. ALTGELT.